(12) United States Patent
Kaiser

(10) Patent No.: US 9,308,482 B2
(45) Date of Patent: Apr. 12, 2016

(54) PLATE FILTER ELEMENT

(75) Inventor: Sven A. Kaiser, Winnenden (DE)

(73) Assignee: Mahle International GmbH (DE)

( * ) Notice: Subject to any disclaimer, the term of this patent is extended or adjusted under 35 U.S.C. 154(b) by 288 days.

(21) Appl. No.: 14/128,816

(22) PCT Filed: Jun. 18, 2012

(86) PCT No.: PCT/EP2012/061556
§ 371 (c)(1),
(2), (4) Date: Jun. 2, 2014

(87) PCT Pub. No.: WO2012/175438
PCT Pub. Date: Dec. 27, 2012

(65) Prior Publication Data
US 2014/0260143 A1 Sep. 18, 2014

(30) Foreign Application Priority Data
Jun. 24, 2011 (DE) .......................... 10 2011 078 057

(51) Int. Cl.
*B01D 46/10* (2006.01)
(52) U.S. Cl.
CPC .............. *B01D 46/103* (2013.01); *B01D 46/10* (2013.01); *B01D 2271/022* (2013.01)
(58) Field of Classification Search
CPC ........... B01D 46/0001; B01D 46/0005; B01D 46/10; B01D 46/521; B01D 2271/02; B01D 2271/022; B01D 2279/60; B01D 2265/026; F02M 35/0203; F02M 35/02416; F02M 35/02491
USPC ........... 55/490, 497, 499, 410, 498, 502, 511, 55/521, 504, 506, 385.3, DIG. 31; 123/198 E
See application file for complete search history.

(56) References Cited

U.S. PATENT DOCUMENTS

| 5,843,198 | A | 12/1998 | Walker |
| 5,902,361 | A | 5/1999 | Pomplun et al. |
| 2004/0194441 | A1 | 10/2004 | Kirsch |
| 2009/0056293 | A1 | 3/2009 | Styles |
| 2014/0318091 | A1* | 10/2014 | Rieger .................... B01D 46/10 55/502 |
| 2014/0318092 | A1* | 10/2014 | Rieger ............... B01D 46/0001 55/511 |
| 2015/0013291 | A1* | 1/2015 | Neef .................. B01D 46/0005 55/499 |
| 2015/0033684 | A1* | 2/2015 | Pettersson .......... B01D 46/0004 55/410 |

FOREIGN PATENT DOCUMENTS

DE 19746804 A1 4/1998

* cited by examiner

*Primary Examiner* — Duane Smith
*Assistant Examiner* — Minh-Chau Pham
(74) *Attorney, Agent, or Firm* — Fishman Stewart PLLC

(57) ABSTRACT

A plate filter element for a filter device may include a filter body having a peripheral edge, which has at least two rectilinear wall sections, which border each other and forming a corner. A seal may be attached to the filter body and be arranged peripherally along the edge. The seal may have an inner contour running around the inside and an outer contour running around the outside. The inner contour may run parallel to the rectilinear edge sections into the respective corner. The outer contour may run parallel to the rectilinear edge sections to a corner region, which contains the respective corner and end sections of the rectilinear edge sections border the respective corner regions. The outer contour may form a bulge, which curves outwards in relation to rectilinear sections of the outer contour, in the corner region.

20 Claims, 8 Drawing Sheets

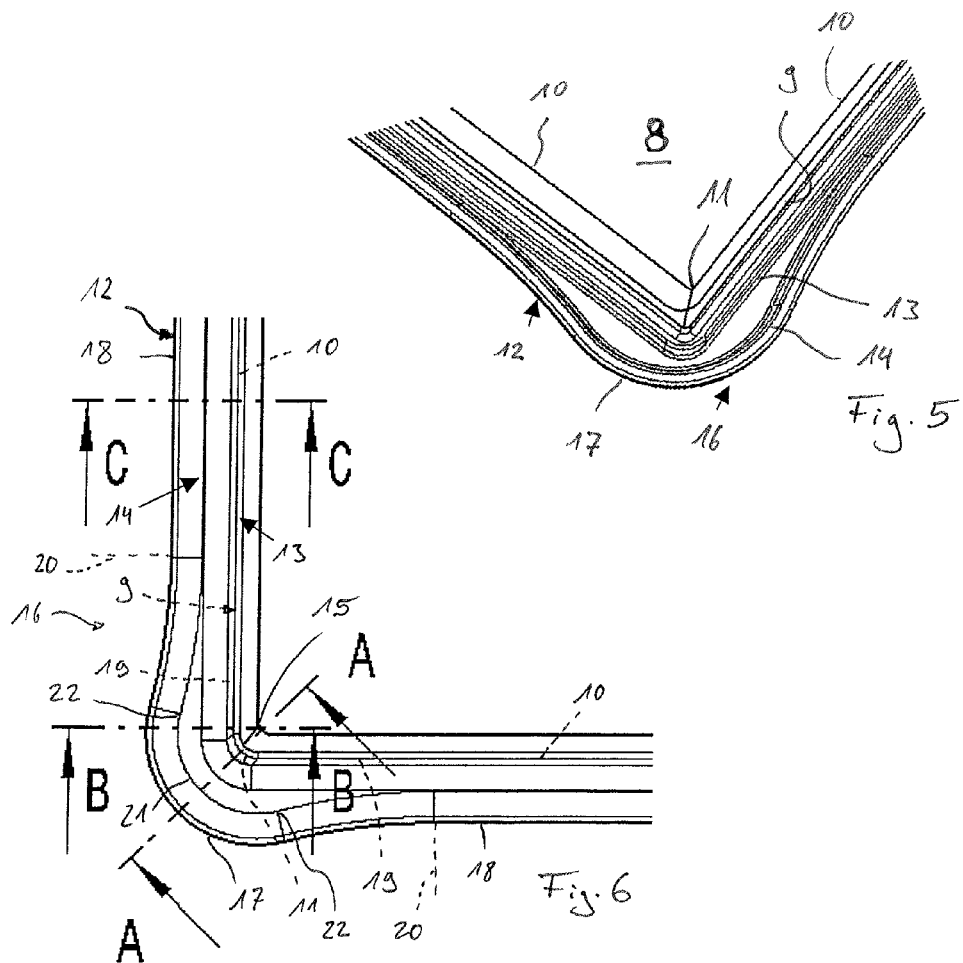
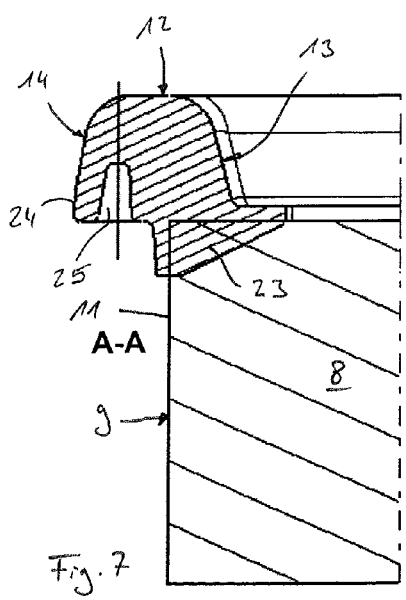
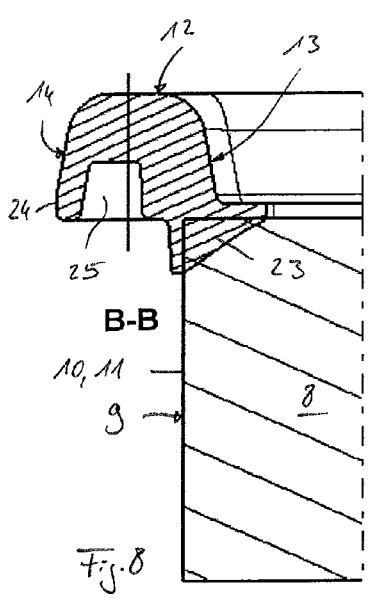
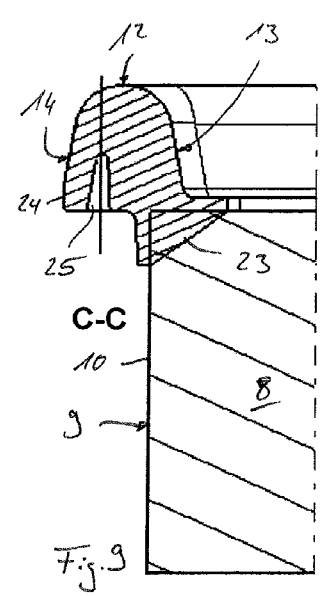

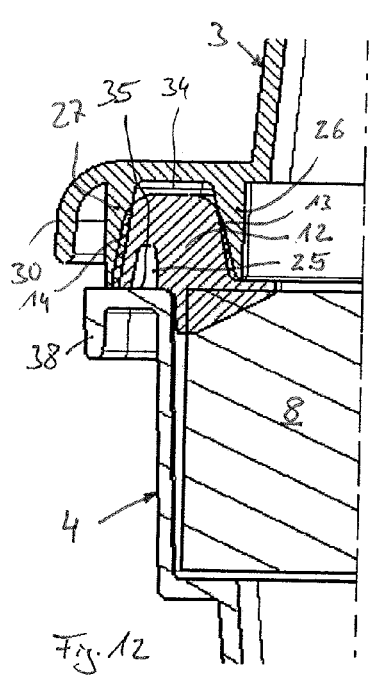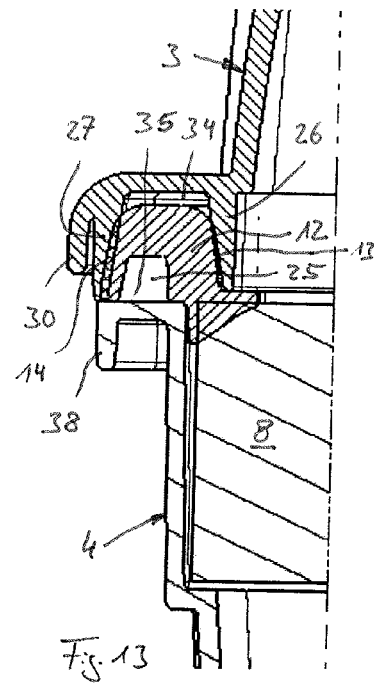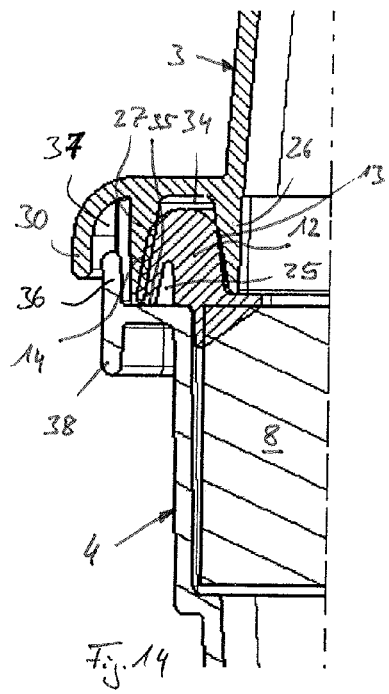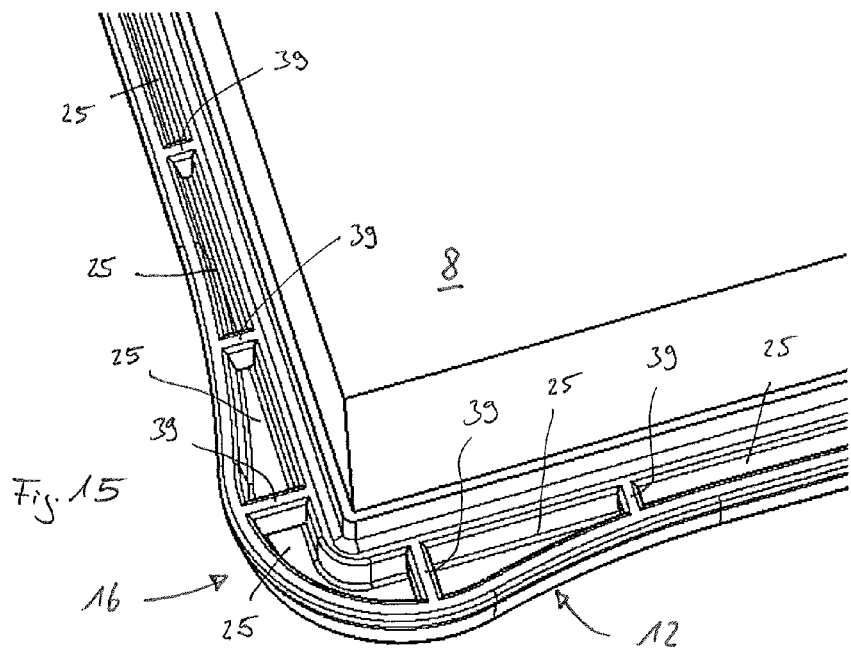

PLATE FILTER ELEMENT

CROSS-REFERENCE TO RELATED APPLICATIONS

This application claims priority to German Patent Application 10 2011 078 057.2 filed Jun. 24, 2011, and International Patent Application PCT/EP2012/061556 filed on Jun. 18, 2012, both of which are hereby incorporated by reference in their entirety.

TECHNICAL FIELD

The present invention relates to a plate filter element for a filter device, in particular for an air filter device, preferably of a motor vehicle. The present invention also relates to a filter housing for a filter device, in particular for an air filter device, preferably of a motor vehicle. The invention finally relates to a filter device, in particular an air filter device, preferably of a motor vehicle, which is equipped with such a filter housing and with such a plate filter element.

BACKGROUND

A plate filter element usually comprises an even, flat filter body, which is generally produced from a web-like, folded filter material. The filter body thereby usually has a peripheral, lateral edge, which surrounds the cross section of the filter body through which flow passes and has at least two rectilinear edge sections, which border each other, forming a corner. The filter body usually has a rectangular cross section through which flow passes, so that four rectilinear edge section border each other at right angles in four corners. For certain applications, however, polygonal and sometimes rounded edge profiles as well as acute and obtuse angles in the corners are also conceivable. The present invention is concerned with filter bodies which have at least one corner.

In order to be able to arranged the filter body in a filter housing in a leakproof manner, a seal is usually attached to the filter body, which seal is arranged peripherally along the edge of the filter body. This seal can be injection-moulded or foamed or adhesively bonded or welded on. The filter body can likewise be plasticised into the seal.

It has been found that sealing between the filter body and the filter housing is problematic in the corner regions. To avoid leaks, contact between the seal and a corresponding counter contour of the filter housing which is as uniform as possible with the most homogeneous force distribution possible is desired. However, this can be implemented only with difficulty in the corners. If the seal follows the contour of the edge, it has a comparatively small radius on the outside, which greatly impedes a homogeneous sealing effect. If, however, the seal follows a comparatively wide radius, which favours a homogeneous sealing performance, the tight connection to the filter body is made more difficult. If attempts are made to lay the seal in the corner region in such a manner that it has a wide radius on the outside and follows the edge of the filter body tightly on the inside, the corner must be replaced in the corner region by a correspondingly arc-shaped, curved contour. This is however associated with a comparatively large outlay for the production of the filter body, as rectangular outer contours are automatically produced by the folding of the web material. To replace a corner by a rounded portion, complex post-processing of the folded filter body is therefore necessary.

SUMMARY

The present invention is concerned with the problem of specifying an improved embodiment for a plate filter element and for a filter housing and for a filter device, which is characterised in particular in that the risk of leakage in the corner region of the plate filter element is reduced while production remains inexpensive.

This problem is solved according to the invention by the subject matter of the independent claims. Advantageous embodiments form the subject matter of the dependent claims.

The invention is based on the general concept of equipping the seal with an inner contour, which runs around the inside, that is, runs around on an inner side of the seal facing the filter body, and an outer contour, which runs around the outside, that is, runs around on an outer side of the seal facing away from the filter body. The inner contour runs parallel to the rectilinear edge sections into the respective corner and thus largely forms the corner. An inner curvature, in particular with an inner radius, can however be provided, which however turns out comparatively small. In contrast, the outer contour of the seal runs first parallel to the rectilinear edge sections, but only as far as a corner region which contains the respective corner and end sections of rectilinear edge sections bordering the respective corner. In the corner region itself, the outer contour runs in such a manner that it forms an outwardly curved bulge compared to the rectilinear sections of the outer contour. This bulge is multiple times bigger than the above-mentioned inner curvature of the inner contour in the corner, so that the outer contour is particularly suitable for homogenising pressure forces with respect to a complementary counter contour of the filter housing and thus the sealing effect. The production of the filter body with the angular edge region can be retained and correspondingly realised in a cost-effective manner by the proposed configuration of the seal. As the seal follows the angular corner with its inner contour, sealing with respect to the filter body can be produced in a sufficiently reliable manner. The desired sealing effect can also be realised in the respective corner region by the bulge in the outer contour in the respective corner region. The formation of the bulge at the seal can be realised comparatively simply in production terms. For example, the seal can be injection-moulded or foamed onto the filter body. Therefore, only one tool is necessary, into which the filter body can be inserted and which contains a negative shape of the seal.

According to an advantageous embodiment, the outer contour can have a curved profile in the respective corner region, which profile has at least two or precisely two turning points along the respective bulge. This produces a particularly simple geometry for the outer contour, which can be reproduced easily. This is advantageous in particular with regard to the complementary counter contour on the filter housing, as low shape tolerances can then be adhered to.

According to an advantageous development, the curved profile between the two turning points can have an arc section. This also simplifies the geometry and thus the reproducibility and makes adherence to comparatively narrow shape tolerances possible.

According to another development, the curved profile at the ends of the corner region can merge tangentially into the rectilinear sections of the outer contour. Disruptive contours or discontinuities such as corners, edges, angles and the like within the outer contour can thereby be avoided, which reduces the risk of leaks.

In another embodiment, the seal can have a connecting region, e.g. in the region of the inner contour, which connecting region is connected in a leakproof manner to the filter body peripherally without interruptions along the edge. The leakproof connection between the seal and the filter body thus takes place e.g. in the region of the inner contour.

In a further embodiment, the seal can have a peripheral sealing lip on the outside in the region of the outer contour. The sealing lip defines a contact zone for the respective counter contour of the filter housing, which improves the sealing effect.

According to another advantageous embodiment, the seal can have a peripheral groove between the inner contour and the outer contour. This groove produces a resilient elasticity in the profile cross section between the inner contour and the outer contour, which makes it possible to absorb forces, which are oriented outwards on an inner side of the inner contour and are oriented inwards on the outer side of the outer contour in a resiliently elastic manner, in order to generate prestress forces oriented in the opposite direction, which support the sealing effect. In other words, the seal can be compressed transversely to its longitudinal direction, which extends in the circumferential direction of the edge, for installation, so that the inner contour can bear in an inwardly prestressed manner against a complementary counter contour and the outer contour can bear in an outwardly prestressed manner against a complementary counter contour.

In a specific development, individual webs can be provided along the groove, which extend transversely to the longitudinal direction of the groove and support side walls of the groove against each other. The resilient elasticity of the seal can thereby be modelled in a targeted manner transversely to its longitudinal direction by means of the dimensioning, number and positioning of the webs, for example to increase the prestress in the corner region.

According to an alternative embodiment, the seal can have at least one depression which is open on one side between the inner contour and the outer contour on one side. If the seal does not have a groove of the above-mentioned type, the elasticity of the seal can be modelled with such depressions, e.g. in the corner region.

In another advantageous embodiment, the seal can be foamed onto the filter body, it being possible in particular for the seal to be produced from polyurethane. Foaming the seal can be realised particularly simply. The use of polyurethane as the seal material has been proven particularly advantageous.

A filter housing according to the invention comprises two housing shells, which can be fastened to each other in a flange region and thus enclose an inner space for accommodating a filter element of the above-described type. The first housing shell can have an inner rib in the flange region, which rib extends in a closed, peripheral manner complementary to the inner contour of the seal of the filter element. Furthermore, the first housing shell can have an outer rib in the flange region, which rib extends in a closed, peripheral manner complementary to the outer contour of the seal of the filter element. In other words, the inner rib follows the largely rectilinear profile of the inner contour of the seal, whereas the outer rib follows the profile of the outer contour of the seal, which profile is curved in the region of the respective bulge. In the installed state, that is, when the filter element is inserted into the filter housing, the inner contour of the seal comes to bear in a closed, peripheral manner against the inner rib of the filter housing, whereas the outer contour of the seal comes to bear in a closed, peripheral manner against the outer rib of the filter housing. This realises effective sealing.

According to an advantageous embodiment, the first housing shell can have an additional rib in the flange region, which rib extends outside the outer rib into the respective corner region parallel to the rectilinear edge sections. The additional rib runs transversely to the longitudinal direction of the seal at a distance from the outer rib. This can give the impression on the filter housing that the seal of the filter element has a conventional contour, which extends in a rectilinear manner into the corners. According to a particularly advantageous development, the additional rib can then have a curved section, which connects the two rectilinear sections to each other. This gives the impression on the filter housing that the rectilinear edge sections merge into each other in a curved manner in the corner region of the filter body. It is particularly expedient in this case that the curved section of the additional rib does not bulge outwards compared to the rectilinear sections of the additional rib. The profile of the curved section of the additional rib thus has no turning point. The curved section of the additional rib can in particular be curved in an arc-shaped manner.

An embodiment in which the additional rib merges into the outer rib in a shape-integrated manner in the corner region is particularly advantageous in this case. This means that a contour which runs around in an interruption-free manner can be seen on the outside of the filter housing, which contour is formed by the additional rib in the region of the rectilinear sections and by the outer rib in the corner region. This makes the filter housing more compact. Material can also be saved.

According to another embodiment, the second housing shell can have a peripheral shoulder, on which the seal is placed, in the flange region. This simplifies the insertion of the filter element into the housing. Also, the peripheral shoulder forms an abutment against which the seal can be pressed in order to be able to press the outer seal and the inner seal into the accommodating space formed between the outer rib and the inner rib. The accommodating space can taper in cross section and/or the seal can taper in cross section in the pressing in direction in which the seal is introduced into the said accommodating space. In other words, the inner rib and the outer rib can be oriented in an inclined manner to each other in the cross section of the flange region and/or the inner contour and the outer contour can be oriented in an inclined manner to each other in the cross section of the seal.

In another embodiment, the second housing shell can have a collar in the flange region on a side facing the first housing shell, which collar runs outside the outer rib and is or can be interrupted in the respective corner region. The positioning of the two housing shells against each other for assembly can be simplified with the aid of such a collar. The collar is expediently positioned on the second housing shell in such a manner that it can project into a spacing space between the outer rib and the additional rib which may be present. The filter housing can be made more compact by means of the interruptions in the collar which may be present in the corner region. In a further embodiment, the second housing shell can have a peripheral reinforcement collar in the flange region on a side facing away from the first housing shell, which reinforcement collar results in intensive reinforcement of the second housing shell in the flange region.

A filter device according to the invention, which is preferably an air filter device, which can be used in particular in a motor vehicle, is provided with a filter housing of the above-described type, into which a filter element of the above-described type is inserted.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
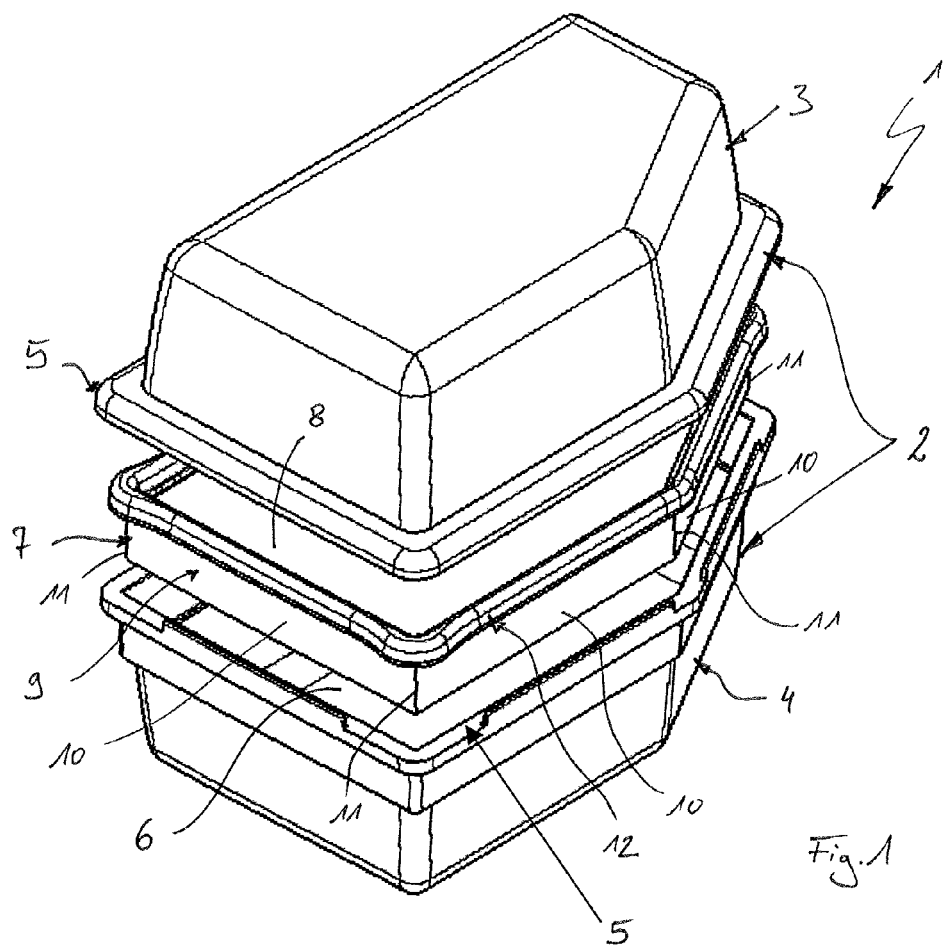
FIG. 1 schematically shows an isometric view of a filter device in an exploded diagram, FIG. 2 schematically shows a plan view of a plate filter element of the filter device, FIG. 3 schematically shows a plan view of a first housing shell of a housing of the filter device, FIG. 4 schematically shows a plan view of a second housing shell of the filter device, FIG. 5 schematically shows an isometric view of a corner region of the filter element, FIG. 6 schematically shows a plan view of the corner region, FIG. 7 schematically shows a sectional view according to section line A-A of FIG. 6, FIG. 8 schematically shows a sectional view according to section line B-B of FIG. 6, FIG. 9 schematically shows a sectional view according to section line C-C of FIG. 6, FIG. 10 schematically shows an isometric view of the first housing shell in a corner region, FIG. 11 schematically shows a plan view of the first housing shell in the corner region, FIG. 12 schematically shows a sectional view of the filter device in the assembled state in a flange region according to section A-A of FIG. 7, FIG. 13 schematically shows a sectional view as in FIG. 12, according to section B-B of FIG. 8, FIG. 14 schematically shows a sectional view as in FIG. 12, according to section C-C of FIG. 9, FIG. 15 schematically shows an isometric view as in FIG. 5, but of a different embodiment, FIG. 16 schematically shows a view as in FIG. 15, but of a further embodiment, FIG. 17 schematically shows a view as in FIG. 15, but of an additional embodiment, FIG. 18 schematically shows an isometric view of a filter element in another embodiment, FIG. 19 schematically shows a plan view of the filter element of FIG. 18, FIG. 20 schematically shows a sectional view of the filter element according to section line D-D of FIG. 19, FIG. 21 schematically shows a sectional view of the filter device according to section D-D of FIG. 20.

According to FIG. 1, a filter device 1 comprises a filter housing 2, which has two housing shells, namely a first housing shell 3 and a second housing shell 4. The two housing shells 3, 4 can be fastened to each other in a flange region 5 and thus enclose an inner space 6. The filter device 1 also comprises a plate filter element 7, which can also be referred to below as filter element 7 and is accommodated in the inner space 6 of the housing 2. The filter device 1 is preferably an air filter device, in particular of a motor vehicle. The filter device 1 can for example be used to filter fresh air, which is supplied to an internal combustion engine of the vehicle or to a passenger compartment of the vehicle.

Figure 2:
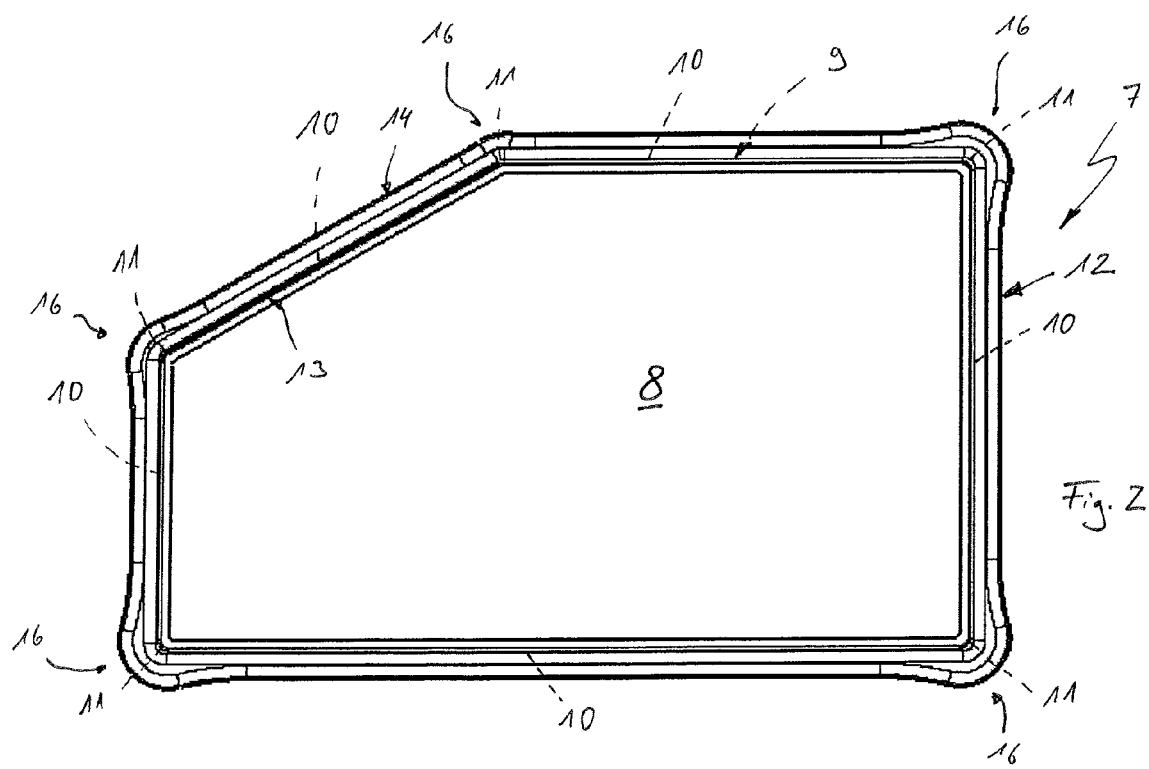

According to FIG. 2, the filter element 7 has an even, flat, plate-shaped filter body 8, which has an edge 9, which is arranged peripherally and laterally such that it surrounds a cross section of the filter body 8 through which flow can pass. This edge 9 has at least two rectilinear sections 10, which border each other, forming a corner 11. In the example, the edge 9 has five rectilinear edge sections 10, wherein each two rectilinear edge sections 10 bordering each other form such a corner 11, so that five such corners 11 are provided in total. The number of rectilinear edge sections 10 and the number of corners 11 is purely by way of example in this case, so more or fewer corners 11 or more or fewer rectilinear edge sections 10 can also be present.

Figure 3:
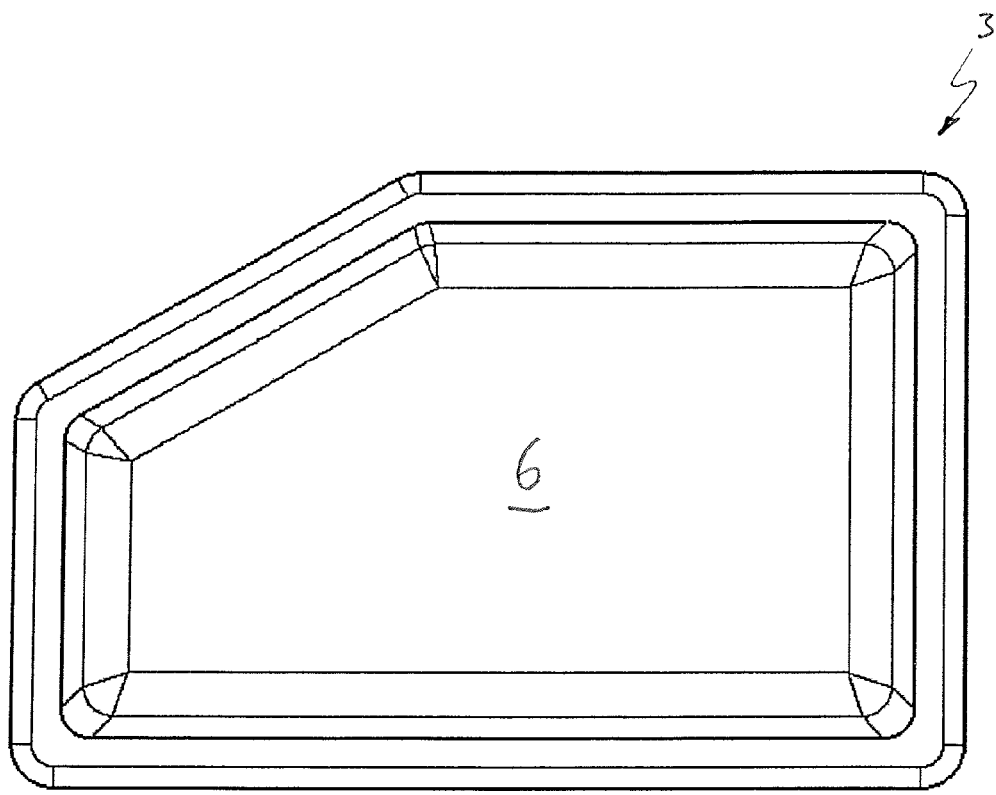

The filter element 7 also has a seal 12, which is attached to the filter body 8 in such a manner that it runs around along the edge 9. The seal 12 is situated in the flange region 5 inside the filter device 1 and in the housing 2. Correspondingly, according to the plan views of FIGS. 3 and 4, the two housing shells 3, 4 have cross sections which are virtually flush with the cross section of the filter element 7 of FIG. 2.

The filter element 7 and its seal 12 are explained in more detail below using FIGS. 5 to 9.

The seal 12 has an inner contour 13 and an outer contour 14. The inner contour 13 is situated on an inner side of the seal 12 facing the filter body 8 and thus runs around the inside. The outer contour 14 is situated on an outer side of the seal 12 facing away from the filter body 8 and thus runs around the outside.

The inner contour 13 runs parallel to the rectilinear edge sections 10 of the edge 9 into the respective corner 11. The inner contour 13 can have, directly in the respective corner 11 only, a rounded transition 15, which is in particular arc-shaped and thus has a comparatively small inner radius. In contrast to this, the outer contour 14 runs only outside a corner region 16 in sections 18 parallel to the rectilinear edge sections 10 of the edge 9, whereas the outer contour 14 forms an outwardly curved bulge 17 in this corner region 16. The bulge 17 is outwardly curved in relation to the rectilinear sections 18 of the outer contour 14. The corner region 16 contains the respective corner 11 of the edge 9 and also contains end sections 19 of the rectilinear edge section 10 of the edge 9 bordering the said corner 11. In FIGS. 2 and 6, to illustrate the corner region 16, border lines 20 are indicated, which show the transition or border between the rectilinear sections 18 of the outer contour 14 and the bulge 17 of the corner region 16.

To form the bulge 17, the outer contour 14 has a curved profile 21 in the corner region 16, which profile has two turning points 22 along the bulge 17. If the profile 21 is followed from the right, for example in FIG. 6, the profile 21 has a left curve from the first border line 20, which curve merges into a right curve at the first turning point 22. At the second turning point 22, this right curve merges into a left curve again, which merges into the rectilinear section 18 at the second region border 20. Between the two turning points 22, the profile 21 in the example shown has an arc section, the radius of which is much greater than the above-mentioned radius at the transition 15 in the corner 11 of the inner contour 13. The curved profile 21 expediently merges into the rectilinear sections 18 of the outer contour 14 at the ends or borders 20 of the corner region 16.

According to FIGS. 7 to 9, the seal 12 has a connecting region 23 on a side facing the filter body 8, which connecting region is connected in a leakproof manner to the filter body 8 along the edge 9 in a peripheral, gapless manner. It can be seen that the filter body 8 is embedded into this connecting region 23. This can be realised for example during injection-moulding or foaming of the seal 12.

The seal 12 can also have a peripheral sealing lip 24 in the region of the outer contour 14, as a result of which a defined sealing contour can be created.

In the embodiment shown in FIGS. 7 to 9 and 12 to 15, the seal 12 has a peripheral groove 25 between the inner contour 13 and the outer contour 14, up to approximately 50% of which groove is introduced into the seal 12. In other configurations, more than 50%, in particular up to approx. 70% of the groove 25 can also be introduced. A softer seal 12 is formed thereby. In other configurations, less than 50% of the groove 25 is introduced. A harder seal 12 is formed thereby. The introduction depth and/or width of the groove 25 can in particular vary. A precisely defined sealing force of the seal 12 on the filter housing 2 can then be generated at any point of the filter element 7, which force can in particular vary in the circumferential direction. The groove 25 increases the elasticity of the seal 12 in particular in the region of the sealing lip 24. The groove 25 can in particular have a varying groove width inside the corner region 16, it being possible in particular for the groove profile to be designed such that a wall thickness of the seal 14 remains largely constant in the region of the sealing lip 24, while a distance of an inner wall of the groove, which faces away from the sealing lip 24, from the edge 9 likewise remains largely constant. The elasticity of the seal 12 can be modelled by the geometry of the groove.

As mentioned, the seal 12 is expediently foamed onto the filter body 8. The seal 12 is in particular produced from polyurethane.

According to FIGS. 10 to 14, the first housing shell 3 has an inner rib 26 and an outer rib 27 in the flange region 5. The inner rib 26 extends peripherally and in a complementary manner to the inner contour 13 of the seal 12. The inner rib 26 thus extends parallel to the rectilinear edge sections 10 into the corner 11, it being possible for a rounded transition 28 to be provided analogously to the transition 15 of the inner contour 13. The outer rib 27 extends peripherally and in a complementary manner to the outer contour 14 of the seal 12. The bulge 17 of the outer contour 14 is thus formed subsequently with the outer rib 27. Accordingly, the outer rib 27 includes a recess 29 in the corner region 16' of the housing 2, which recess runs in a complementary manner to the bulge 17 of the seal 12.

Figure 11:
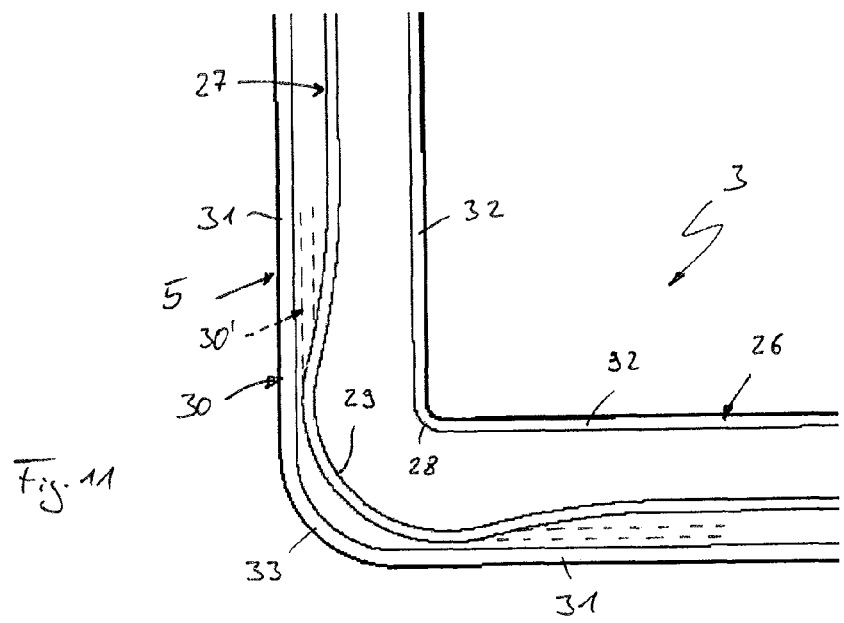

Furthermore, the first housing shell 3 can have an additional rib 30 in the flange region 5, which additional rib is provided in addition to the inner rib 26 and in addition to the outer rib 27 and runs into the respective corner region 16' outside the outer rib 27 parallel to the rectilinear edge sections 10. The additional rib 30 thus has rectilinear sections 31, which run parallel to rectilinear sections 32 of the inner rib 26. Inside the corner region 16', the additional rib 30 comprises a curved section 33, which connects the two rectilinear sections 31 to each other. In contrast to the outer rib 27, this curved section 33 is not curved outwardly compared to the rectilinear sections 31 in the case of the additional rib 30, but is formed as a simply contoured, curved transition, like the transition region 28 of the inner rib 26. Only the radius of the transition 33 is selected to be greater than the transition 28. An alternative profile for the additional rib is also indicated in FIG. 11 with a dashed line, for which profile the additional rib is labelled 30'. In this alternative profile of the additional rib 30', the additional rib 30' in the corner region 16' merges in a shape-integrated manner into the outer rib 27, as a result of which installation space and material can be saved.

Figure 4:
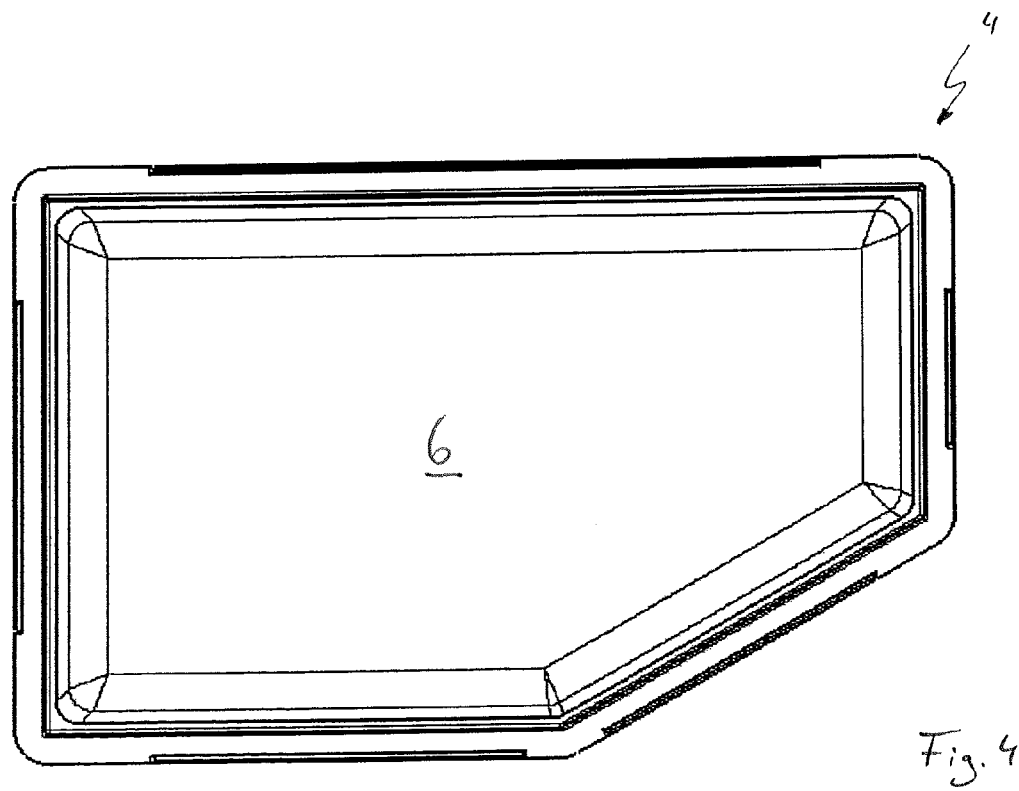
Figure 10:
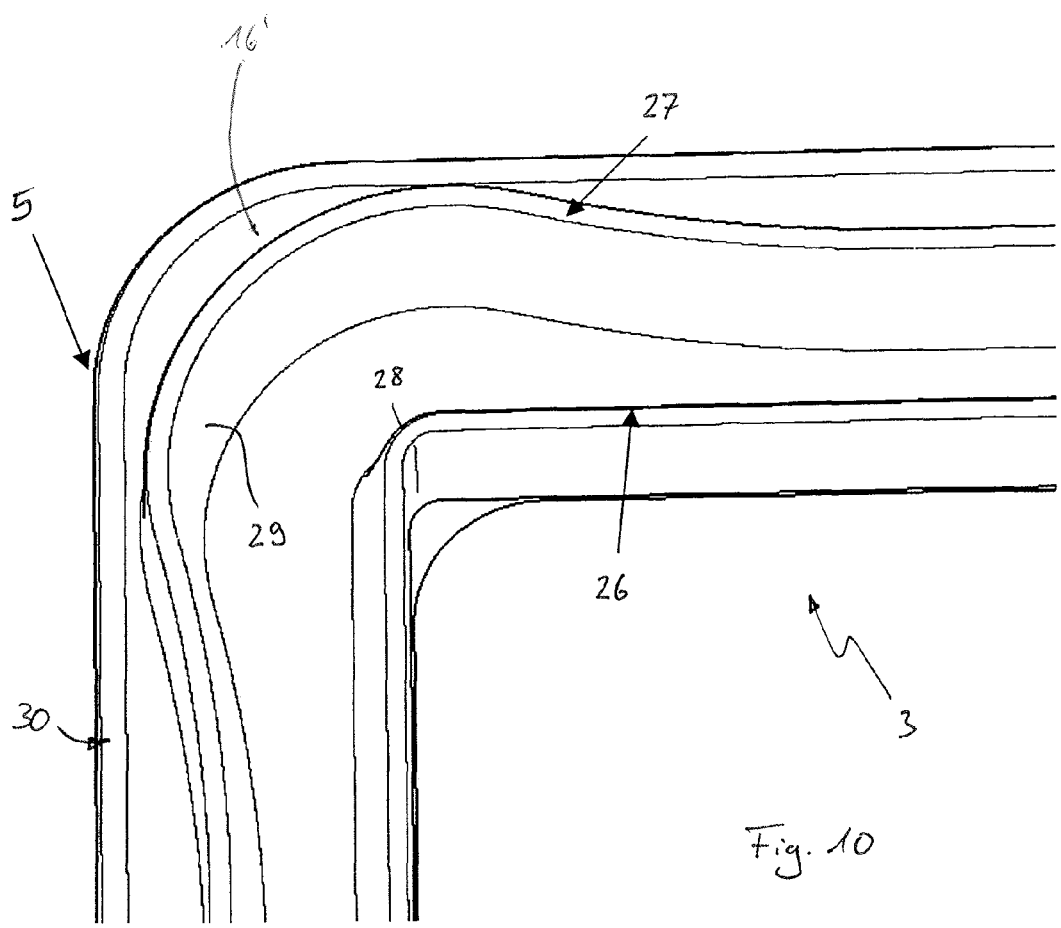

In FIGS. 12 to 14, the assembled state can be seen, in which the housing 2 is closed and the filter element 7 is arranged in the housing 2. To this end, the seal 12 is incorporated into the flange region 5. The fixing of the two housing shells 3, 4 to each other thus also results in the filter element 7 being fixed to the two housing shells 3, 4. The inner rib 26 and the outer rib 27 define a seal accommodation space 34 into which the seal 12 is inserted. The inner rib 26 and the outer rib 27 define a tapering cross section for the seal accommodation space 34 in relation to the insertion direction. Further, the inner contour 13 and the outer contour 14 are inclined relative to each other, so that the seal 12 also has a tapering cross section in relation to the insertion direction. Comparatively great pressing forces can be realised thereby, with which the outer contour 14 comes to bear against the outer rib 27 and the inner contour 13 comes to bear against the inner rib 26. As can be seen in particular in FIGS. 4 and 12 to 14, the second housing shell 4 has a peripheral shoulder 35 in the flange region 5, against which shoulder the seal 12 bears when in the assembled state. Further, in the example a collar 36, which can be seen in FIGS. 4 and 14, is formed in the flange region 5 on the second housing shell 4, which collar runs outside the outer rib 27 and—if an additional rib 30 is present—inside the additional rib 30. According to FIG. 14, the collar 36 engages in a free space 37, which is produced by the spacing between the outer rib 27 and the additional rib 30. As can be seen in FIGS. 1 and 4, this collar 36 can be interrupted in the corner regions 16 or 16'.

Further, the second housing shell 4 according to FIGS. 12 to 14 has a reinforcement collar 38 on the outside in the flange region 5, which reinforcement collar is arranged peripherally on a side facing away from the first housing shell 3.

The two housing shells 3, 4 are expediently injection-moulded parts. The ribs 26, 27, 30 can then be formed integrally on the first housing shell 3. The collar 36 and the reinforcement collar 38 can be formed integrally on the second housing shell 4.

According to FIG. 15, it can be provided in a specific embodiment for the elasticity of the seal 12 to be modelled with the aid of webs 39, which are arranged in the groove 25, extend transversely to the peripheral longitudinal direction of the groove 25 and support side walls (not shown) of the groove 25 against each other.

Figure 16:
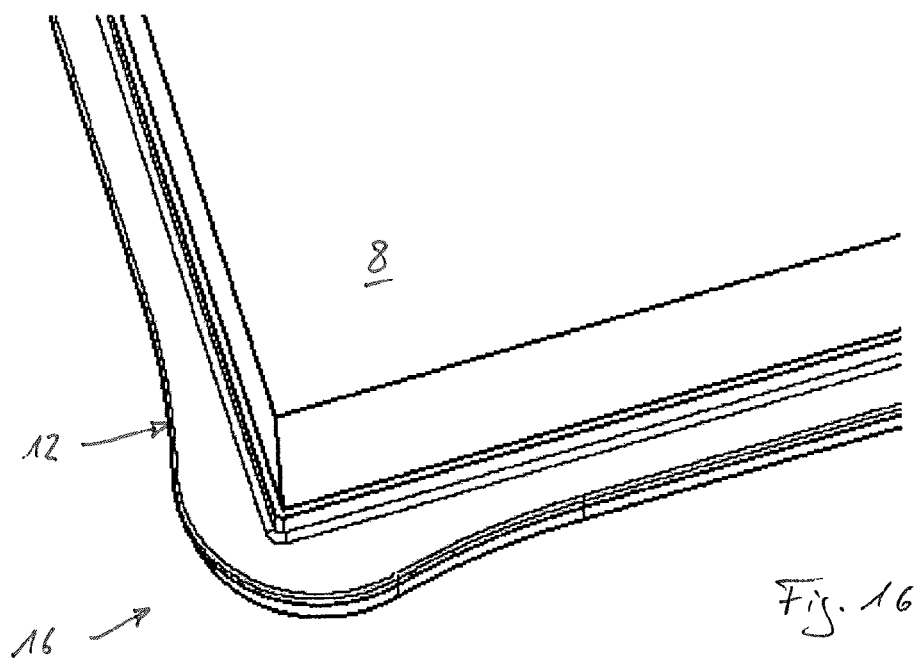

FIG. 16 shows an alternative embodiment of the seal 12, in which the seal 12 has a solid cross section between the inner contour 13 and the outer contour 14.

Figure 17:
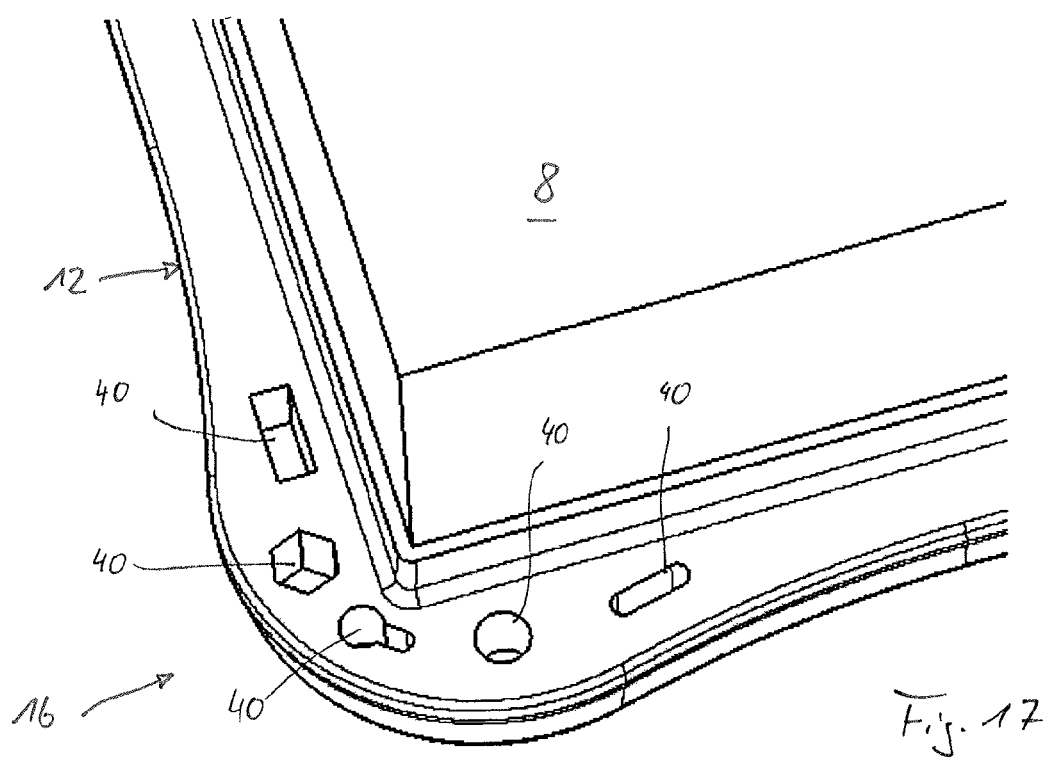
Figure 18:
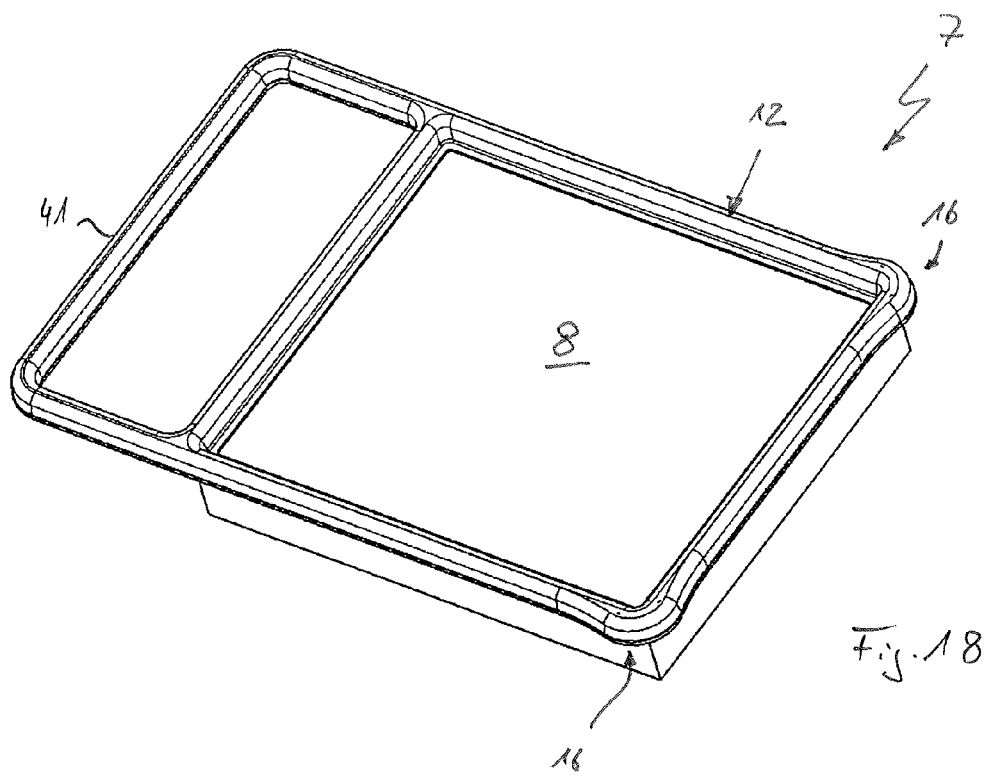
Figure 19:
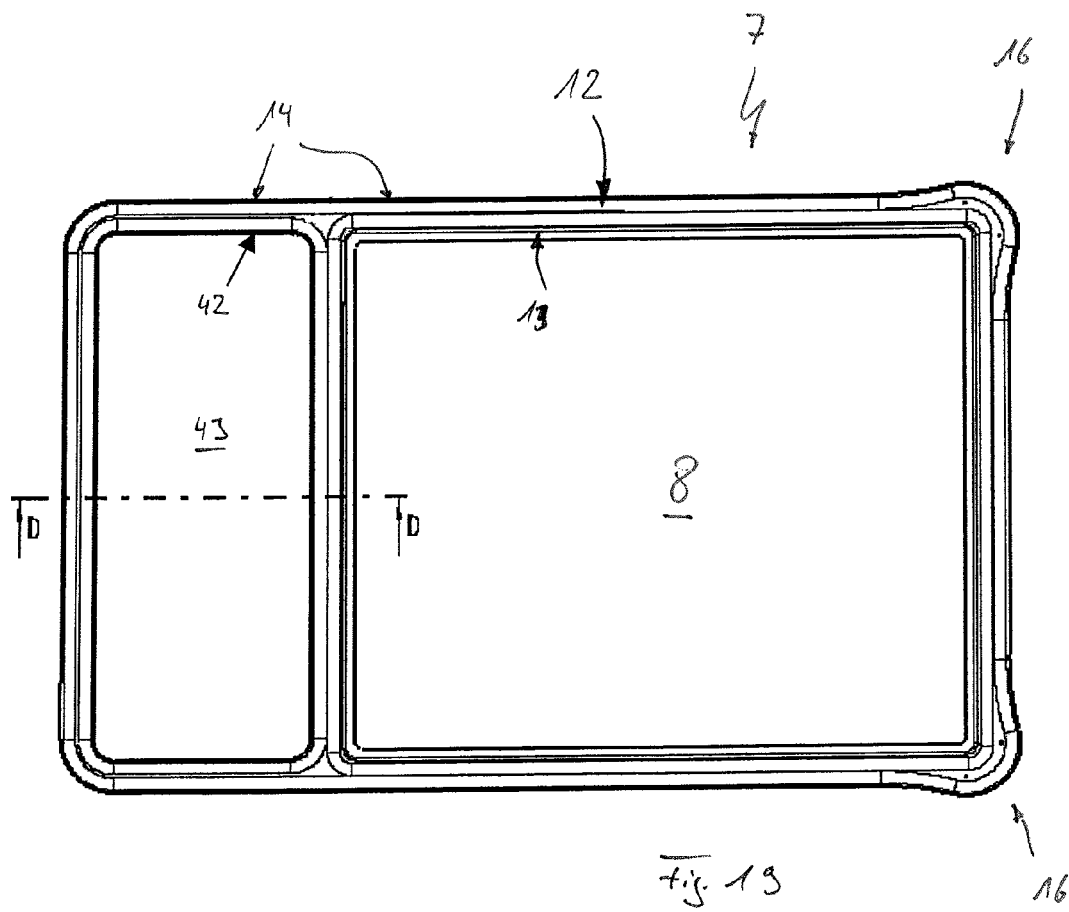
Figure 20:
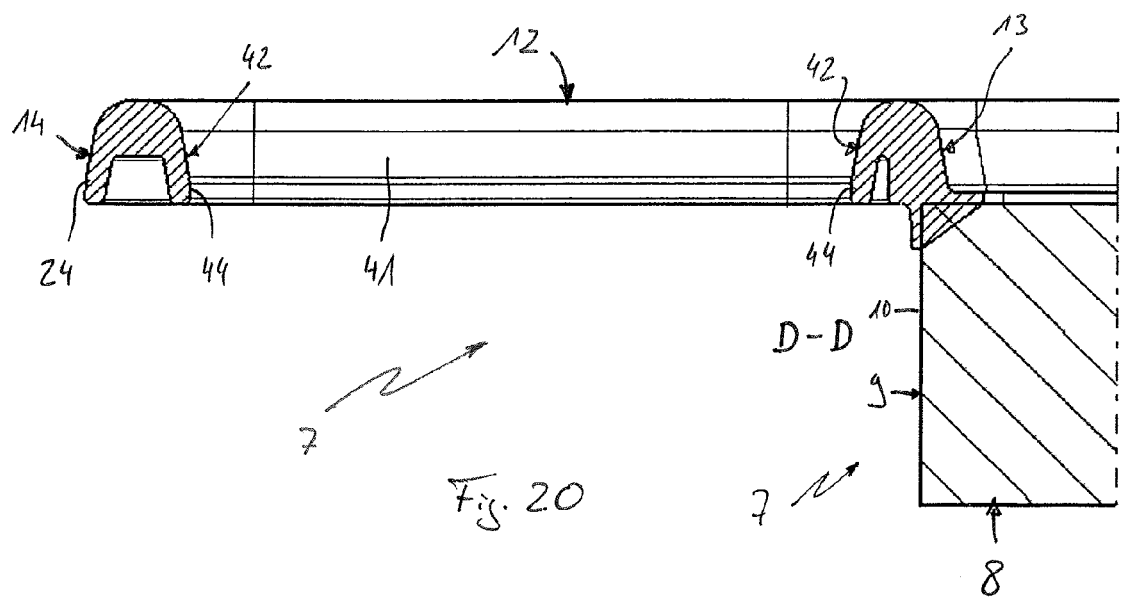
Figure 21:
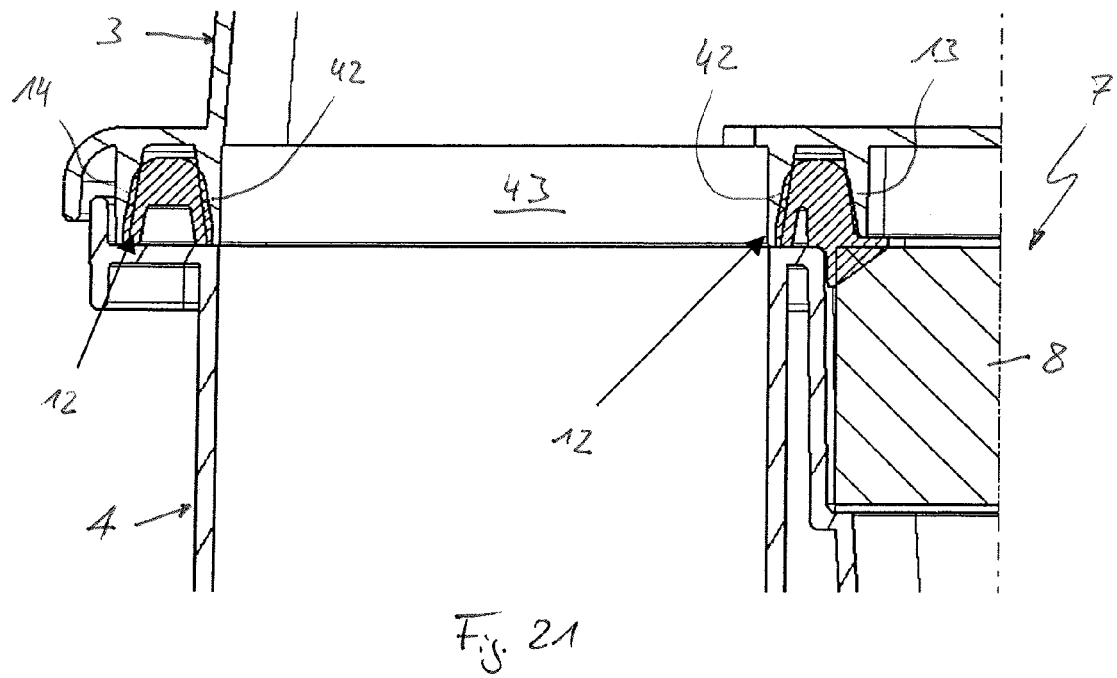

FIG. 17 shows a modification of the seal 12 of FIG. 16 such that the seal 12 contains at least one depression 40, which is open on one side, on a side facing the shoulder 35 between the inner contour 13 and the outer contour 14. In FIG. 17, several such depressions 40 are shown purely by way of example and differ from each other in terms of positioning and geometrical shape. The elasticity of the seal 12 can be modelled by the application of such depressions 40.

FIGS. 18 to 21 show a further specific embodiment of the filter element 7, which then results in corresponding analogous modifications on the filter housing 2. In this modified filter element 7 the filter body 8 is configured to be rectangular, an extension 41 of the seal 12 being formed on a longitudinal side of this rectangular cross section. This extension 41 has the shape of a U-shaped frame and thereby encloses a through opening 43. The through opening 43 can for example enclose an inlet opening or outlet opening of the housing 2. It is noticeable that the seal 12 for this extension 41 and for the main region associated with the filter element 8 has a common, completely closed, peripheral outer contour 14, while two separate inner contours 13 and 42 are provided. One inner contour 13 runs along the edge 9 of the filter body 8. The other inner contour 42 encloses the above-mentioned through opening 43. In particular, the further inner contour 42 according to FIGS. 20 and 21 can form a further sealing lip 44, which runs around in a closed manner and extends in particular parallel to the sealing lip 24 of the outer contour 14.

The invention claimed is:

1. A plate filter element for a filter device, comprising:
a filter body having a peripheral edge, which has at least two rectilinear wall sections, which border each other forming a corner,
a seal attached to the filter body and arranged peripherally along the edge,
wherein the seal has an inner contour running around the inside and an outer contour running around the outside,
wherein the inner contour runs parallel to the rectilinear edge sections into the respective corner,
wherein the outer contour runs parallel to the rectilinear edge sections to a corner region, which contains the respective corner and end sections of the rectilinear edge sections bordering the respective corner, the outer contour forming a bulge, which curves outwards in relation to rectilinear sections of the outer contour, in the corner region.

2. The filter element according to claim 1, wherein the outer contour in the respective corner region has a curved profile, which has two turning points along the respective bulge.

3. The filter element according to claim 2, wherein the curved profile has an arc section between the two turning points.

4. The filter element according to claim 2, wherein the curved profile merges tangentially into the rectilinear sections of the outer contour at the ends of the corner region.

5. The filter element according to claim 1, wherein the seal has a connecting region, which is connected in a leak proof manner to the filter body peripherally along the edge.

6. The filter element according to claim 1, wherein the seal has a peripheral sealing lip in the region of the outer contour.

7. The filter element according to claim 1, wherein the seal has a peripheral groove between the inner contour and the outer contour, wherein individual webs are provided along the groove, which webs extend transversely to the groove and support side walls of the groove against each other.

8. The filter element according to claim 1, wherein the seal has at least one depression which is open on one side, wherein the at least one depression is on a side of the seal between the inner contour and the outer contour.

9. The filter element according to claim 1, wherein the seal is at least one of foamed onto the filter body and produced from polyurethane.

10. A filter housing for a filter device, comprising:
two housing shells, which can be fastened to each other in a flange region and thus enclose an inner space for accommodating a filter element, wherein the filter element includes:
a filter body having a peripheral edge, which has at least to rectilinear wall sections, which border each other forming a corner,
a seal attached to the filter body, and arranged peripherally along the edge,
wherein the seal has an inner contour running around the inside and an outer contour running around the outside,
wherein the inner contour runs parallel to the rectilinear edge sections into the respective corner,
wherein the outer contour runs parallel to the rectilinear edge sections to a corner region, which contains the respective corner and end sections of the rectilinear edge sections bordering the respective corner, the outer contour forming a bulge, which curves outwards in relation to rectilinear sections of the outer contour, in the corner region,
wherein a first housing shell has an inner rib in the flange region, which rib extends peripherally in a complementary manner to the inner contour of the seal of the filter element,
wherein the first housing shell has an outer rib in the flange region, which rib extends peripherally in a complementary manner to the outer contour of the seal of the filter element.

11. The filter housing according to claim 10, wherein the first housing shell has an additional rib in the flange region, which additional rib extends outside the outer rib into the respective corner region parallel to the rectilinear edge sections, wherein it can in particular be provided for the additional rib has a curved section which connects the two rectilinear sections to each other.

12. The filter housing according to claim 10, wherein a second housing shell has a peripheral shoulder, onto which the seal is placed, in the flange region.

13. The filter housing according to claim 10, wherein a second housing shell has a collar in the flange region on a side facing away from the first housing shell, which collar runs outside the outer rib and can be interrupted in the respective corner region.

14. The filter housing according to claim 10, wherein a second housing shell has a peripheral reinforcement collar in the flange region on a side facing away from the first housing shell.

15. The filter element according to claim 3, wherein the curved profile merges tangentially into the rectilinear sections of the outer contour at the ends of the corner region.

16. The filter element according to claim 2, wherein the seal has a connection region, which is connected in a leak proof manner to the filter body peripherally along the edge.

17. The filter element according to claim 2, wherein the seal has a peripheral sealing lip in the region of the outer contour.

18. The filter element according to claim 2, wherein the seal has at least one depression which is open on one side, wherein the at least one depression is on a side of the seal between the inner contour and the outer contour.

19. The filter element according to claim 6, wherein the seal has a peripheral groove between the inner contour and the outer contour, wherein individual webs are provided along the groove, which webs extend transversely to the groove and support walls of the groove against each other.

20. The filter housing according to claim 11, wherein a second shell has a peripheral shoulder, onto which the seal is placed, in the flange region.

* * * * *